Figure 1:
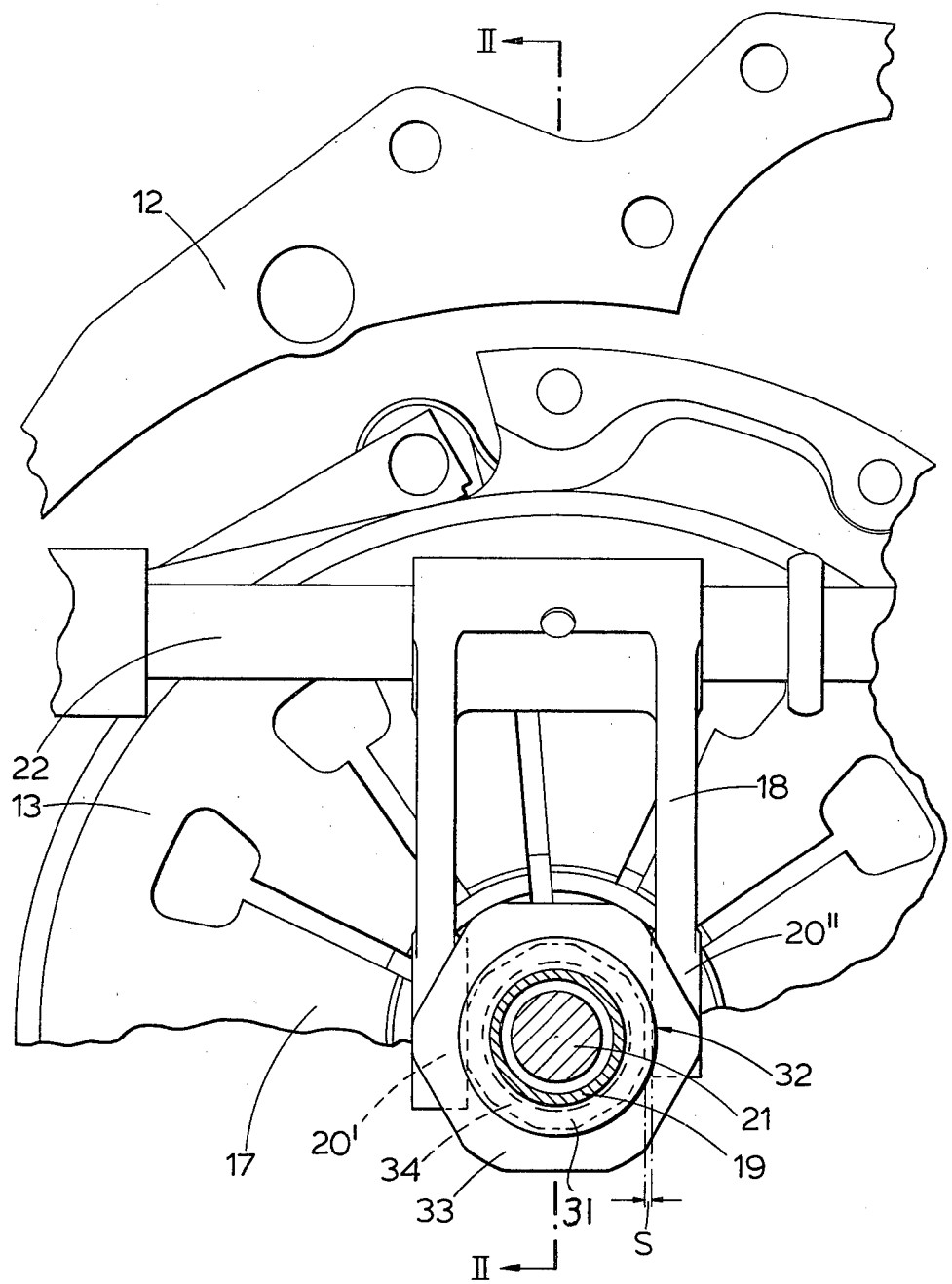

United States Patent [19]

Dee

[11] 4,393,968
[45] Jul. 19, 1983

[54] CLUTCH RELEASE BEARING ASSEMBLIES

[75] Inventor: Christopher P. Dee, Bishop Tachbrook, England

[73] Assignee: Automotive Products Limited, Leamington Spa, England

[21] Appl. No.: 217,808

[22] Filed: Dec. 18, 1980

[30] Foreign Application Priority Data

Dec. 22, 1979 [GB] United Kingdom ............... 7944327

[51] Int. Cl.³ ............................................. F16D 23/14
[52] U.S. Cl. .................................... 192/98; 29/428; 192/99 S; 192/110 B
[58] Field of Search ...................... 192/89 B, 98, 99 S, 192/101, 110 B, 110 S; 29/428

[56] References Cited

U.S. PATENT DOCUMENTS

| | | | |
|---|---|---|---|
| 1,887,776 | 11/1932 | Morral | 192/89 B |
| 3,104,746 | 9/1963 | Gadd et al. | 192/98 X |
| 4,228,882 | 10/1980 | Huber et al. | 192/89 B X |
| 4,238,018 | 12/1980 | Maucher | 192/89 B X |

FOREIGN PATENT DOCUMENTS 437052 10/1935 United Kingdom ............ 192/110 B

Primary Examiner—Rodney H. Bonck
Attorney, Agent, or Firm—Kemon & Estabrook

[57] ABSTRACT

A release bearing assembly for a pull type clutch and which includes a stem attached to the stationary race of its bearing and which is accommodated between two arms of a release fork. The stem has a flange against which the arms abut during release of the clutch. The stem has a polygonal cross section, preferably hexagonal, providing pairs of diametrically opposed flats engagable with the fork arms, and the flange is also polygonal in shape, preferably hexagonal, and is angularly offset relative to the stem so that engagement of the arms with any pair of flats on the stem causes the stem to rotate on the bearing and thereby align the corners of the polygonal flange with the fork arms.

4 Claims, 2 Drawing Figures

CLUTCH RELEASE BEARING ASSEMBLIES

This invention relates to annular release bearing assemblies for pull type friction clutches in which a release fork moves the assembly along a guide away from the clutch driven plate to release the clutch.

Such assemblies are frequently used for operating the friction clutches of motor vehicles and the guide is typically the motor vehicle gearbox input shaft, or a sleeve surrounding the input shaft. A problem associated with pull type clutches is that, for example, with a diaphragm spring clutch the release bearing must be fitted to the centre of the diaphragm spring prior to fitting the clutch onto the engine flywheel, and therefore it is sometimes difficult to feed the release lever fork into its operating position after fitting the clutch to the flywheel.

Yet another problem associated with this type of release assembly is that the radially inner ends of the diaphragm spring fingers permanently engage the rotary race of the release bearing assembly and therefore there is a constant drag between the rotary race and the stationary race that tends to try to rotate the stationary race of the bearing.

The herein disclosed invention provides a method of restraining the stationary race from rotating and provides a method of overcoming the difficulties associated with feeding the fork lever into its operation position.

Accordingly there is provided an annular release bearing assembly for a pull type friction clutch in which to release the clutch a release fork moves the assembly away from the driven plate along a guide, the assembly having a stam associated with the stationary race of its bearing and which can be accommodated between two arms of the fork, said stem having a flange against which the two arms of the fork abut during release movement wherein the cross section of at least part of the stem that is a polygon, providing diametrically opposed flats engagable with the fork arms, portions of the flange not engageable with the fork arms are of reduced radial width, the flange being orientated relative to the stem so that engagement of the fork arms with any pair of opposed flats on the stem automatically causes the stem to rotate on the bearing and align the radially wider portions of the flange with the fork arms.

Conveniently the flange is a regular polygon having the same number of sides as the polygonal stem, preferably a hexagon.

Figure 2:
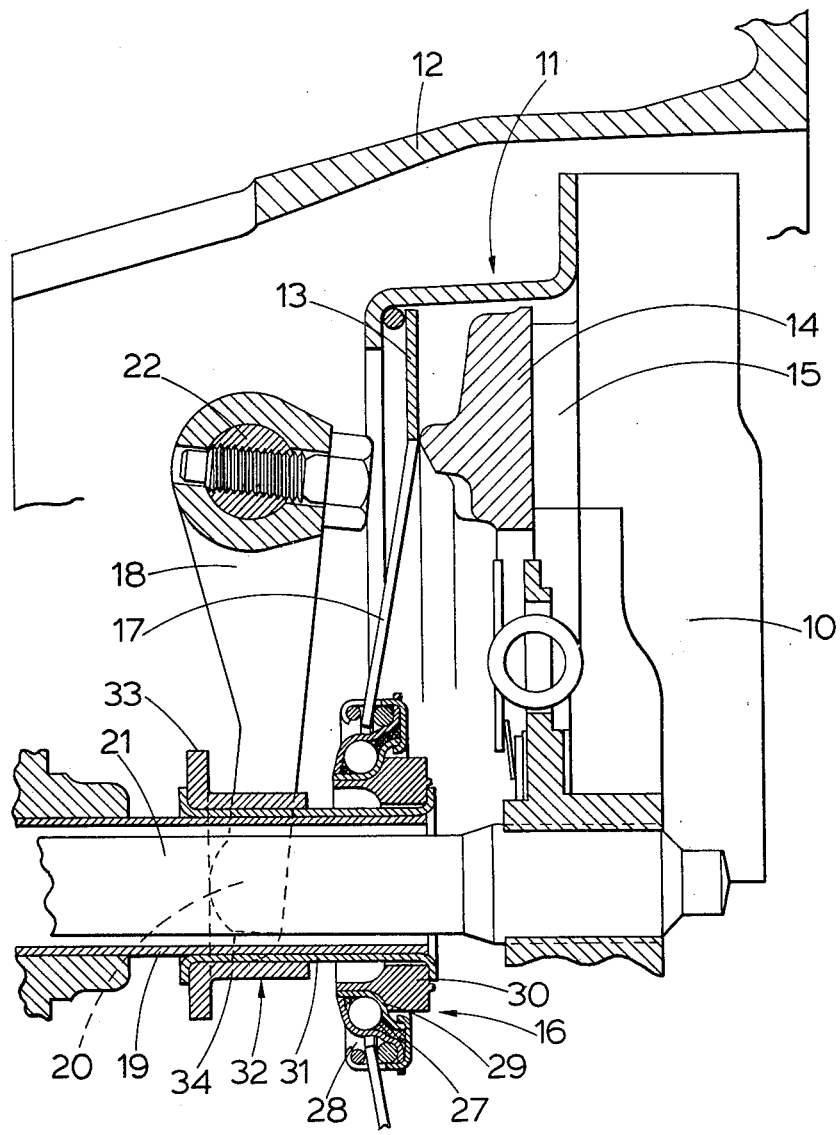

The invention will be described with reference to the accompanying drawings in which:

FIG. 1 shows an elevation of a release bearing according to this invention fitted in situ on a diaphragm spring clutch on a vehicle flywheel; and FIG. 2 is a section on the line II—II of FIG. 1.

With reference to FIG. 1 and FIG. 2 of the drawings a pull type friction clutch assembly 11 is shown in situ in an engine bell housing 12. The friction clutch assembly 11 is of the diaphragm spring type in which a diaphragm spring 13 biases a pressure plate 14 so as to grip a driven plate 15 between the pressure plate and the engine flywheel 10.

An annular release bearing assembly 16 is fitted to the radially inner ends of the diaphragm spring fingers 17. The bearing assembly 16 is movable by a release fork 18 having arms 20 of different lengths, to move the bearing assembly 16 axially away from the clutch driven plate 15 (axially relative to the axis of rotation of the clutch). The opposed inside surfaces of the two fork arms 20 are flat and mutually parallel. This movement causes the inner ends of the spring fingers 17 to move away from the driven plate 15 reducing the gripping load exerted by the diaphragm spring 13 and releasing the driven plate. The axial movement of the bearing assembly 16 is guided on a sleeve 19 that surrounds the gearbox input shaft 21, and passes through the centre of the assembly 16.

The fork 18 is secured on a shaft 22 pivoted to the engine bell housing 12 and rotation of the shaft by a clutch operating mechanism, such as a cable or hydraulic cylinder, causes the free end of the fork to move along the sleeve 19.

The bearing 27 of the bearing assembly 16 has its rotary race 28 secured to the radially inner ends of the spring fingers 17 and its stationary race 29 connected via support 30 to a co-axial stem 31. The stem 31 is slidable on the sleeve 19 and at one end is secured to the support 30 and at its other end portion has a collar 32 press fitted thereon. The collar 32 has a radial flange 33 that provides abutment surfaces against which the free ends of the fork 18 act during the clutch release operation, and a cylindrical trunk 34 which locates between the two arms 20 of the fork 18.

The trunk 34 has a cross section of the form of a regular hexagon and is arranged so that the diametrically opposed flats of the hexagon are loosely engagable with the fork arms 20 so that there is a small clearance 'S' allowing slight relative lateral movement of the fork 18 whilst the opposed flats engage the fork arms 20 to restrain rotation of the stem 31 and hence the stationary race 29.

The flange 33 is also of the form of a regular hexagon which is angularly offset from the hexagon on the trunk 34 of the collar, as can be seen in FIG. 1. The width across the corners of the hexagon being equal to the outer distance across the forks.

The above described assembly facilitates the fitting of the fork 18 into its operative position as follows:

The release bearing assembly has been previously fitted to the clutch which has in turn been fitted to the vehicle flywheel in the engine bell housing 12.

With reference to FIG. 2 the ends of the fork arms 20 must then be passed from left to right over the top of the flange 33 to engage with the side of the flange adjacent the bearing 27.

The fork 18 is fed over the top or around the side of the flange so that the flat inside surface of the longer arm 20', of the two arms, hits a flat of the hexagonal trunk 34. The engagement of the arm 20' with the trunk 34 causes the stem 31 to rotate on the bearing 27. The stem 31 will rotate until a flat on the hexagonal trunk engages with the arm 20' this bringing two opposed flats into alignment between the two arms 20 and the shorter arm 20" can then be passed over its respective flat on the trunk 34. The small clearance between the trunk and the arms also facilitates this process.

The engagement of the arm 20' with a flat on the trunk ensures that the stem 31 will only rotate until a flat on the angularly offset hexagonal flange 33 is uppermost relative to the fork shaft 22. Since the flats have a smaller radius from the axis of rotation than the corners of the hexagon, the fork arms 20 can pass over the flats more easily than a similar circuit flange of the same diameter as the corners. Further, since the corners of the hexagonal flange 33 align with the flats on the trunk 34 the engagement of the arms 20 with the flats on the trunk automatically brings the corners of the flange into alignment with the two fork arms 20 so that the fork arms engage only those portions of the flange 33 that have the maximum radial width.

I claim:

1. An annular release bearing assembly for a pull type friction clutch in which to release the clutch a release fork moves the assembly away from the clutch driven plate along a guide, said assembly comprising;

a bearing having a stationary race;

a co-axial cylindrical stem secured to the stationary race of the bearing and having at least part with a cross-section in the form of a polygon providing pairs of diametrically opposed flats engagable between the fork arms;

and a radial flange secured on the stem providing an abutment against which the fork arms act during release of the clutch, said flange having portions of reduced radial width which are not engageable with the fork arms, and said flange is orientated relative to the stem so that engagement of the fork arms with any pair of opposed flats on the stem automatically cause the stem to rotate on the bearing and align the radially wider portions of the flange with the fork arms.

2. A release bearing assembly as claimed in claim 1, wherein the flange is of a regular polygon shape having the same number of sides as the polygonal stem.

3. A release bearing assembly as claimed in claim 2, wherein the cross-section of said part of the stem and the shape of the flange are of a regular hexagon shape, and the hexagon of the flange is angularly offset relative to the hexagon of the stem so that engagement of fork arms with the flats on the stem automatically aligns the corners of the flange for abutment with the fork arms.

4. A motor vehicle friction clutch having a release bearing as claimed in any one of claims 1 to 3, wherein the release fork has a pair of arms, and one arm is longer than the other, so that on insertion of the release fork into its operative position in the clutch, the longer arm encounters the polygonal stem and causes the stem to turn so that the flats on the stem become aligned between said arms.

* * * * *